United States Patent
Lueder et al.

(10) Patent No.: US 6,198,810 B1
(45) Date of Patent: Mar. 6, 2001

(54) AUTHENTICATION SYSTEM FOR A COMMUNICATION NETWORK

(76) Inventors: Reinhard Lueder, Bergfriedstr 16, D-83607 Holzkirchen; Renate Zygan-Maus, Glötzleweg 35, D-81477 München, both of (DE)

(*) Notice: Subject to any disclaimer, the term of this patent is extended or adjusted under 35 U.S.C. 154(b) by 0 days.

(21) Appl. No.: 09/066,401
(22) PCT Filed: Oct. 31, 1996
(86) PCT No.: PCT/EP96/04758
§ 371 Date: Apr. 30, 1998
§ 102(e) Date: Apr. 30, 1998
(87) PCT Pub. No.: WO97/16915
PCT Pub. Date: May 9, 1997

(30) Foreign Application Priority Data

Nov. 2, 1995 (DE) .................................................. 95117274

(51) Int. Cl.[7] .......................... H04M 17/00; H04M 15/00
(52) U.S. Cl. .......................... 379/114; 379/115; 379/144; 379/145
(58) Field of Search ............................... 379/91.01, 91.02, 379/112, 114, 115, 127, 121, 144, 145, 188, 189, 196, 197, 198; 455/406, 407, 408; 340/825.33, 825.34; 235/380, 382, 382.5; 705/44

(56) References Cited

U.S. PATENT DOCUMENTS

| | | | |
|---|---|---|---|
| 5,438,615 | * | 8/1995 | Moen .................................... 379/144 |
| 5,479,494 | * | 12/1995 | Clitherow ............................. 379/144 |
| 5,495,521 | * | 2/1996 | Rangachar ........................... 379/189 |
| 5,566,234 | * | 10/1996 | Reed et al. ........................... 379/145 |
| 5,592,537 | * | 1/1997 | Moen .................................... 379/144 |
| 5,812,650 | * | 9/1998 | Gammino ............................. 379/196 |
| 5,875,236 | * | 2/1999 | Jankowitz et al. ................... 379/145 |

* cited by examiner

Primary Examiner—Curtis A. Kuntz
Assistant Examiner—Rexford N Barnie
(74) Attorney, Agent, or Firm—Bell, Boyd & Lloyd LLC

(57) ABSTRACT

In some communication services such as, for example, virtual card calling (VCC), authentification methods are employed to check the access authorization of the caller using the communication service to make possible misuse more difficult. The present invention make such possible misuse even more difficult and undesirable, by instituting a preliminary, cancellable charging which is attributable to the caller should the caller be unable to provide proper authentification of access authorization pursuant to predetermined criteria.

4 Claims, 1 Drawing Sheet

AUTHENTICATION SYSTEM FOR A COMMUNICATION NETWORK

BACKGROUND OF THE INVENTION

1. Field of the Invention

Figure 1:
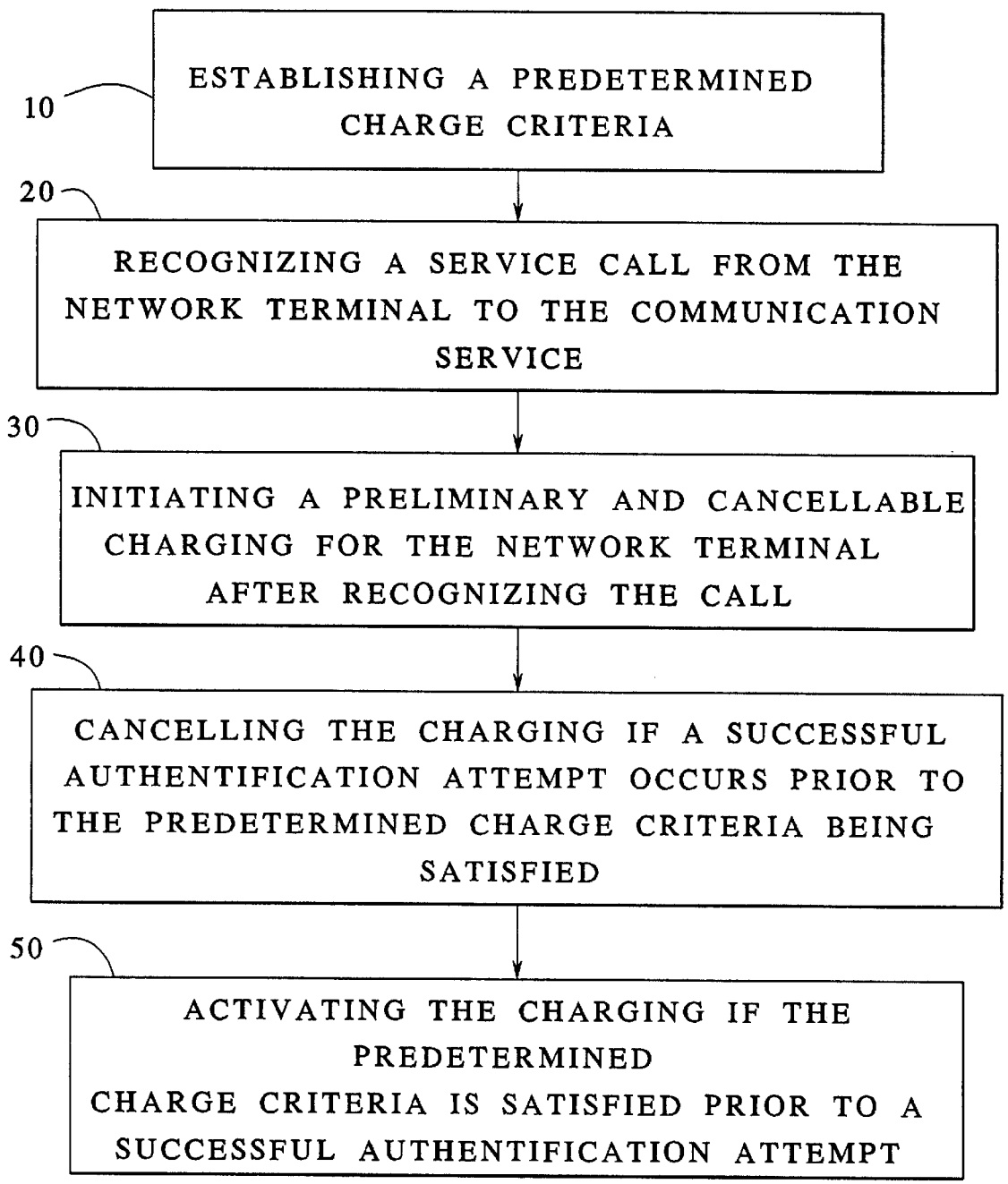

The present invention relates to a method for authentification of access authorization in a communication network wherein a preliminary, cancellable charging is charged to a caller on the network should the caller be unable to provide proper authentification of access authorization pursuant to predetermined criteria.

2. Description of the Prior Art

Authentification methods which check access authorization of a caller for a communication service, and which subsequently assign charges to the caller, are usually employed for some communication services that, for example are performed with the assistance of an intelligent network. Such network may include, for example, virtual card calling, universal personal telecommunication, remote access to virtual private network and multimedia services.

Such authentification methods are usually based on the input of a user identification (for example, a card number) and, potentially, an additional personal identification number (PIN). This authentification date must be kept secret from the user. However, such authentification methods can offer only limited security. Indeed valid authentification data can be fundamentally identified by testing a greater plurality of data. It can then be fraudulently used, for example, in order to implement communication processes at the expense of another person.

Acceptance problems arise when this misuse (illegal use) is to be made more difficult by employing numbers having many digits because extremely long inputs are then necessary for normal use (legal use).

Making misuse more difficult could also be fundamentally effected by charging a fee for unsuccessful authentification procedures. These charges, however, could not occur at the expense of the user since this user has not yet been identified at the time of unsuccessful authentification procedures. A charge instead at the expense of the terminal employed, on the other hand, is undesirable for the legal use of these services because it is contrary to the billing principle of these services. According to this billing principle, the terminal employed should remain free of charge because it can belong to a third party which is provided these services.

The consequence of these circumstances is that, when controlled, by a PC, for example, thousands of authentification attempts can be fraudulently automatically implemented (with prospects of success) without the fraudulent caller (illegal user) incurring charges therefor. The misuse can, thus, be commercially exercised.

Yet another instance of misuse is made easier due to the fact that unsuccessful authentification procedures are free of charge. For security reasons, access to the service is usually blocked for a user when a predetermined number of PIN entry errors is exceeded under the user's identification. Malefactors can use this in order to intentionally block access to services for other persons—and without incurring any charges.

SUMMARY OF THE INVENTION

The present invention is based on the object of making aforesaid misuse more difficult without thereby negatively affecting the legal use of associated services.

As a result of the inventive charging disclosed herein, unsuccessful authorization procedures that are caused by input errors continue to be free of charge up to a specific number for the normal user (more precisely, for the terminal via which the user calls the service) when a successful authentification ultimately occurs within the same call. In case of misuse, by contrast, the attempted fraudulent use becomes subject to a charge due to the great number of unsuccessful authentification procedures. The misuse thus becomes economically undesirable.

In an embodiment of the present invention, therefore, a method for authentification of access authorization at a network terminal for a communication service in a communication network is disclosed, which includes the steps of: establishing a predetermined charge criteria; recognizing a service call from the network terminal to the communication service; initiating a preliminary/cancellable charging for the network terminal after recognizing the call; cancelling the charging if a successful authentification attempt during the service call at the network terminal occurs prior to the predetermined charge criteria being satisfied; and activating the charging if the predetermined charge criteria is satisfied prior to the successful authentification attempt at the network terminal during the service call.

In an embodiment, the predetermined charge criteria relates to a set number of unsuccessful authentification attempts.

In an embodiment, the predetermined charge criteria relates to a time period within which a successful authentification attempt must be made.

In an embodiment, the method further includes the step of determining a statistical probability of achieving a random successful authentification attempt, wherein the predetermined charge criteria relates to the statistical probability.

Additional features and advantages of the present invention are described in, and will be apparent from, the Detailed Description of the Preferred Embodiments.

DETAILED DESCRIPTION OF THE PREFERRED EMBODIMENTS

Pursuant to the present invention, the charging means that, for example, is used in a switching center in the network is configured such that it can undertake a preliminary, cancellable charging. The particular quality of this charging is such that it takes effect when a call is ended before a cancellation of the charging has ensued.

The executive sequence of the inventive method is as follows:

When, given a call to an appertaining service, the service controller (given realization of the service with the IN has recognized a complete but unsuccessful authentification, it empowers that switching center to which the terminal of the caller is allocated to activate the preliminary, cancellable charging. In an alternative embodiment of the present invention, such activation can also occur immediately at the start of the call. This, however, is less favorable because premature aborts that are not based on a misuse are then chargeable.

The activation is subsequently implemented by the authorized switching center before the caller learns of the result of the authentification check. It is thus assured that the misuser cannot carry out any individual attempts free of charge. When the service controller subsequently recognizes a successful authentification, it gives the order to cancel the charging and the entire authentification event remains free of charge. When, however, a call is ended after the transgression of an allowable number of unsuccessful authentification attempts without a following, successful authentification attempt leading to a cancellation of the preliminary charges, the call is charged.

The allowable number of unsuccessful authentification attempts within a call be set, for example, to three. When it is exceeded, then the call is charged in any case. One possibility of implementation is that the call is then also cleared down.

In such case, the following is achieved:

a) For the normal user (legal user) of the terminal, via which the user calls the service, to be more precise, unsuccessful authentification attempts that are caused by input errors continue to be free of charge up to a specific number thereof when a successful authentification nonetheless ultimately occurs within the same call.

b) In case of misuse, however, the attempted fraudulent use becomes chargeable due to the great number of unsuccessful authentification attempts. The misuse thus becomes economically undesirable.

Of course, the explained method also can be fashioned such that the cancellable charging is calculated according to time units (expiration of allowable time by which to properly enter authentification other than the number of unsuccessful authentification procedures. When the cancellable charging occurs according to both time units and the number of attempts, a further embodiment is realized wherein a cancellable charging according to time units occurs at the beginning of the call, and the cancellable charging based on the number of authentification attempts is only activated after a specific number of unsuccessful authentification attempts occur.

A further method for making misuse more difficult is now disclosed wherein a random-controlled charging of unsuccessful authentification attempts occurs with predetermined probability. The execution of the method is as follows:

A call to an appertaining service is initially begun free of charge. When the service controller recognizes an unsuccessful authentification attempt, it determines under random control when charging should occur for the terminal used by the caller. Given a positive result of the random controller, it forwards a charging order to the charging means; for example, an exchange in the network. The charging thereby takes effect before the caller learns of the result of the authentification check. A probability is prescribed for the random controller; for example, 1:20.

In this case, the following is achieved:

a) Given input errors, the normal user need only count on the fact that the terminal being used will be charged a fee only with a probability of, for example, 1:20.

b) In case of misuse, a high number of misattempts necessarily arises during trial and error. For example, an average of 10,000 misattempts can be necessary in order to randomly hit on a successful authentification. Given a charge probability of, for example, 1:20, 500 attempts must then be paid. The misuse can then become economically undesirable, particularly when relatively low credit limits are defined for the accounts found to be fraudulent.

The probability to be prescribed for the random control can, on the one hand, be adapted to the existing degree of statistical security and, on the other hand, can be adapted to the anticipated user acceptance of charging for misattempts.

This relatively simple method of making misuse more difficult by random-controlled charging for unsuccessful authentification attempts is particularly advantageous when the existing degree of statistical security is relatively high due to a greater number of digits for user identification and/or PIN, so that an extremely great number of authentification attempts is needed in case of misuse.

When both methods, namely cancellable charging and random-controlled charging, are combined, the probability that the normal user will be subject to a charge given input errors is reduced even further. Given input errors, the user only has to count on the fact that a fee will be charged with the random probability of, for example, 1:20 when a subsequent, successful authentification is not implemented within the same call.

Unfortunately, misattempts in case of misuse are then also charged only with the predetermined random probability. This, however, can be adequate when the existing degree of statistical security is relatively high due to a greater number of digits for the user identification and/or PIN, so that an extremely great number of authentification attempts is needed in case of misuse.

Although the present invention has been described with reference to specific embodiments, those of skill in the art will recognize that changes may be made thereto without departing from the spirit and scope of the invention as set forth in the hereafter appended claims.

What is claimed is:

1. A method for authentification of access authorization at a network terminal for a communication service in a communication network, comprising the steps of:

establishing a predetermined charge criteria;

recognizing a service call from the network terminal to the communication service;

initiating a preliminary and cancellable charging for the network terminal after recognizing the call;

cancelling the charging if a successful authentification attempt during the service call at the network terminal occurs prior to the predetermined charge criteria being satisfied; and activating the charging if the predetermined charge criteria is satisfied prior to the successful authentification attempt at the network terminal during the service call.

2. A method for authentification of access authorization as claimed in claim 1, wherein the predetermined charge criteria relates to a set number of unsuccessful authentification attempts.

3. A method for authentification of access authorization as claimed in claim 1, wherein the predetermined charge criteria relates to a time period within which a successful authentification attempt must be made.

4. A method for authentification of access authorization as claimed in claim 1, further comprising the step of:

determining a statistical probability of achieving a random successful authentification attempt, wherein the predetermined charge criteria relates to the statistical probability.

* * * * *